United States Patent Office.

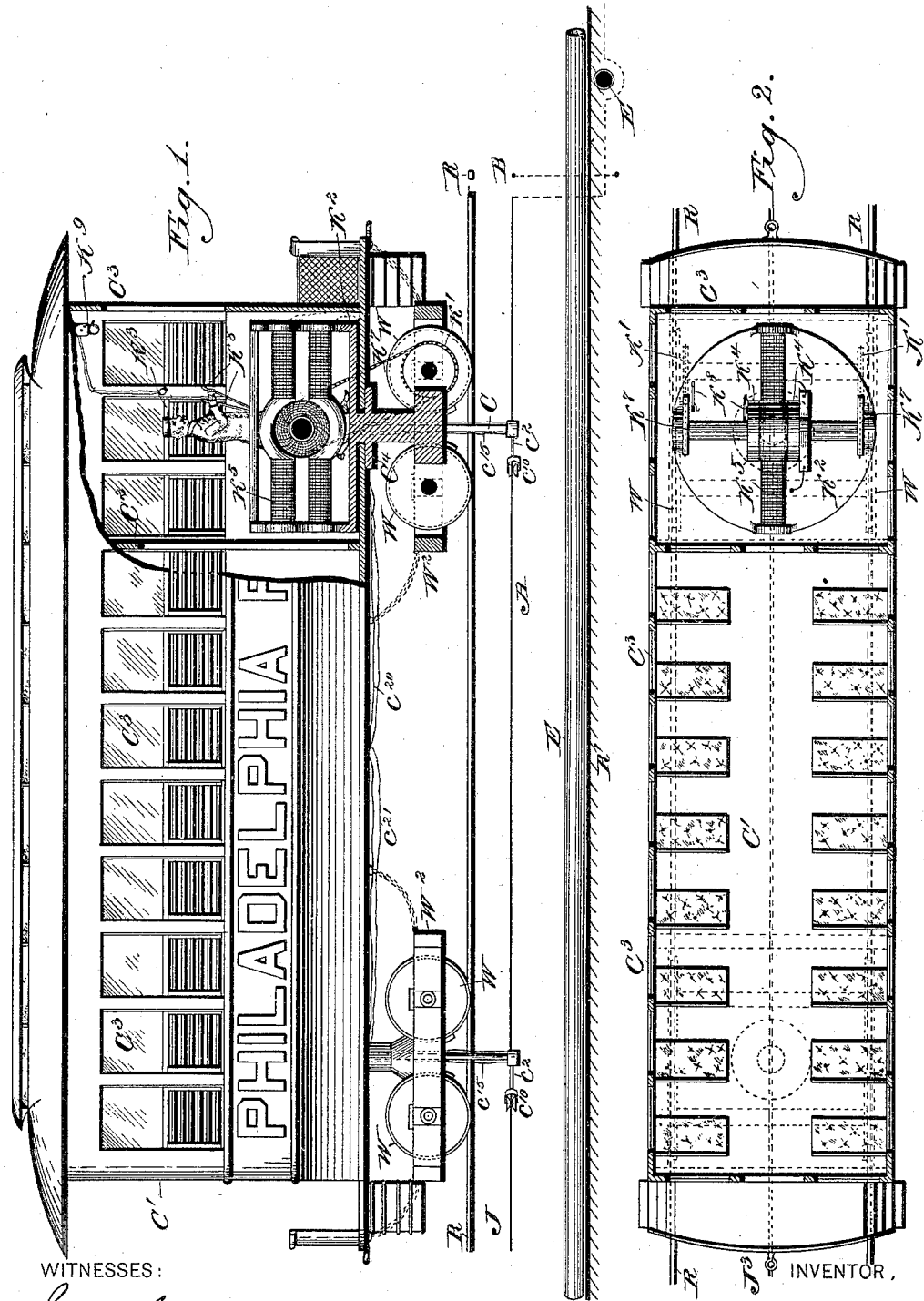

ISAAC W. HEYSINGER, OF PHILADELPHIA, PENNSYLVANIA.

MOTOR-CAR FOR ELECTRIC RAILWAYS.

SPECIFICATION forming part of Letters Patent No. 391,793, dated October 30, 1888.

Original application filed April 21, 1887, Serial No. 235,584. Divided and this application filed December 16, 1887. Serial No. 258,059. (No model.)

*To all whom it may concern:*

Be it known that I, ISAAC W. HEYSINGER, of Philadelphia, in the county of Philadelphia and State of Pennsylvania, have made a certain new and useful Improvement in Motor-Cars for Electric Railways, &c., of which the following is a full, clear, and exact description, reference being had to the drawings accompanying and forming a part of this application, in which—

Figure is a side elevation of a motor-car adapted for use as a passenger-car embodying my invention, partially broken away in front to show the mechanism thereof; and Fig. 2 is a transverse sectional view of a similar car, showing the seats for passengers and the motor-dynamo in place.

In both views the car is represented as standing upon a trackway in accordance with the drawings and descriptions contained in my applications for Letters Patent dated April 21, 1887, Serial No. 235,584, and November 29, 1887, (divided from former,) Serial No. 256,396, respectively.

In this application I make no claim to any of the parts claimed in the above applications relating to construction of trackway and electric-supply service, but confine myself to the motor-car and its construction, as hereinafter described and claimed, my said motor-car being adapted for use with the systems embodied in the above-described applications, and also for use with other railways, as will be hereinafter fully set forth.

The lettering in both the figures is uniform.

My invention relates to the construction and means for operating a motor-car for electric railways in which a motor-dynamo or other source of electric energy is carried upon the said car to produce rotation of the driving-wheels thereof and cause the car to move upon the trackway provided therefor. This motor-dynamo may be operated, as shown in the figures, by a parallel pair of electric conducting-leads extended along the trackway and supplied with electricity from generating-stations located along the line of railway, connection being made with the motor-dynamo of the car through suitable current-gathering devices carried by the said car and moving along in contact with said conducting-leads; but it may also be supplied with electricity from storage or secondary batteries carried upon the car itself or upon other cars of the train, or it may be operated from an electric circuit overhead along the line of railway, or by electricity generated and supplied to the said electric source of mechanical energy in other ways. So, also, in lieu of the trackway shown, the motor-car may be operated upon ordinary roads or road-beds prepared for the purpose, or upon telpherage ropes or rods, or wherever such motor-car may be required or used. The motor-car, also, may be a simple traction-car operating a train of cars, but carrying no freight or passengers itself, or it may be a combination-car, as shown in the figures, one part being provided with seats for passengers, &c., and the motor-dynamo carried in a separate compartment of the car.

My invention consists in the means whereby I apply the motive power of my motor-dynamo to the traction-wheels of a motor-car.

The truck of my car, at the end where the motor-dynamo is situated, is provided with a platform attached thereto and supported by the axis of horizontal rotation of said truck, preferably by an enlarged post attached rigidly to said truck and extending up through the floor of said motor-car, so as to support the said platform within the body of the car, the said platform being also securely attached to the upper end of the said post or support. As the car advances, following the various curvatures of the road, the platform will rotate upon the same vertical axis as the truck at the end of the car beneath the same. Upon a shoulder of this vertical post the bottom of the car at the front end is supported, either upon springs or otherwise, the post thus sustaining the weight of the forward end of the car, and through it the weight of the car is supported upon the truck, which is thus pivoted to insure easy motion of the truck—the same motion, in fact, which is obtainable by the use of ordinary railway-trucks. It will now be seen that while the platform is within the body of the car it partakes of the horizontal motion of the truck and of all the motions thereof, while the car as a whole is only influenced by the resultant of the motions of both trucks upon which it is supported. Such a car as I have described would externally resemble an ordinary passenger-car, if so desired. Upon this platform, within the body of the car, I place the motor-dynamo which operates the driving-wheels of the car, and I make this platform large enough to enable the machinery to be securely attached thereto, and I also preferably provide it with floor-surface to accommodate the engineer who operates the car. I usually make it circular in shape, and large enough to cover nearly the whole transverse diameter of the car, and I separate the motor from the passenger-compartment by a partition, as shown. This platform thus provided with the coils, armatures, electro-magnets, and gearing of the motor also moves with the truck, and the relation between all the parts is constantly maintained. To the horizontal axis of the rotating armatures of the motor-dynamo, or geared thereto, is a sprocket-wheel at each side of the car nearly over the driving-wheels, and a chain belt extends around each of these sprocket-wheels, passes down through the rotating platform, or alongside it, and engages with a similar sprocket-wheel upon the axle of the driving-wheels upon each side of the car. Instead of a double gearing, a single sprocket-wheel gear or other means of communicating power may be employed, if preferred, and I combine them in other well-known ways. I regulate the relative sizes of the sprocket-wheels or other gear to the requirements of speed, power, draft, &c., as they vary for the special construction to be used, and as both platform and truck have the same relative motions it is obvious that no twisting of the chain-gearing can occur. I pass this sprocket-chain directly down to the axle.

My invention also relates to the specific construction of the various parts of the above, as will be hereinafter explained.

Referring to the drawings, in Fig. 1 is represented a traction-car in side view upon a railway-track, the said car having a passenger-compartment at the rear end and a compartment in front, in which is placed a motor-dynamo operated by electricity and connected with the traction or driving wheels of said car, as shown. In the figure this motor-dynamo is supplied with electro-motive energy from the permanent leads A B of the electric railway, the current being carried through the current-gatherers $c^{10}$ $c^{10}$ and their connections to the motor-dynamo K and back through the opposite or return wire to the return-lead B, and thence through the leads back and forth from the generating-dynamos located along the line of railway. The motor-dynamo K may, however, be supplied with electricity from secondary batteries carried under the seats of the car or elsewhere, or the electricity may be generated on the spot by thermal or other means.

R R are the rails upon which the car C' travels.

W W W W are the wheels of the car, and $W^2$ $W^2$ are the frames of the trucks, each provided with four wheels, as shown in the figures, though any suitable form of pivoted and partially rotating truck may be used, said trucks supporting the body of the car above through the usual pivoted supports.

The trackway R R is shown as having a central slot, $J^3$, and a conduit, J, beneath, through which the current-gatherers $c^{10}$ pass down and connect with the electric leads A B. These current-gatherers are, as shown, attached to and supported by said trucks at the centers of horizontal rotation thereof upon the pivoted supports of said car, and partake of the motions of said trucks independently of each other and of the motions of the body of said car as a whole. They are also made in duplicate, so that one pair—positive and negative—is attached to the forward truck and the other pair to the rear truck of said car, and these current-gatherers $c^{10}$ $c^{10}$ are connected with the motor-dynamo of said car by flexible connections $c^{15}$ from the rear truck, and by connecting-wires extending up through the central platform and dynamo support of the front truck. To enable the current-gatherers to project downward within a slotted conduit, elongated supporting-bars C C sustain the current-gatherers, but these bars C C may vary in length according to the position of the conducting-leads, or may be dispensed with and the current-gatherers attached to the trucks directly when the conducting-leads lie very near the truck-frames. The bars C C are firmly secured to the said truck-frames at their centers of motion and serve to direct the current-gatherers $c^{10}$ $c^{10}$, so as to present in the direction of travel of each truck and independently of the movement of the other truck or of the body of the car. In the front truck the supporting-pivot which carries the forward end of the car and allows it to rotate thereupon as the trackway curves is prolonged into a heavy vertical post, $C^4$, which extends up through the floor of the car, and is provided at its upper end with a large circular platform, $K^2$, rigidly attached to said post and partaking of all its motions. Beneath the floor of the car the said post is provided with a flanged expansion, $c^4$, upon which the forward end of the body of the car is supported.

To the platform $K^2$ are secured the supports of the motor-dynamo $K^5$, so that the said dynamo is built upon and firmly secured to said platform. The armature-shaft of this motor-dynamo extends across the platform $K^2$ from side to side, and is firmly attached to and supported by the frame-work of the same. At each end of said shaft a sprocket-chain, $K^7$ $K^7$, passes around a sprocket-wheel upon said shaft, and thence extends downward through a slot at each side of said platform and engages with a sprocket-wheel, K' K', upon the axle of the driving-wheels and immediately within the same.

The motor-dynamo $K^5$ is provided with brushes, commutators, resistances, switches, and all the appurtenances in use for such motors, and it is controlled, through the hand-levers K⁸ K⁸, by the engineer or operator K³, who stands or sits upon the platform K², as shown in Fig. 1.

K⁹ is an electric-alarm bell operated by the push-button near the head of the engineer K³. Motion is communicated from the rotating armatures K⁴, partially broken away in Fig. 2, to show the armature through the casing to its shaft, and through the sprocket-chains K⁷ K⁷ to the sprocket-wheels K′ K′ of the axle of the driving-wheels.

The levers K⁸ K⁸ apply the brakes or reverse the engine. The brakes are not shown in the figures, and may be of any of the ordinary kinds in use.

As the car advances the trucks will follow the curvatures of the line, while the car as a whole will conform to the resultant of the motions of the two trucks. In my invention, however, the motor-dynamo conforms to the motions of the forward truck alone; hence the driving-shaft of the motor-dynamo will bear a constant relation to the axle of the driving-wheels of the truck, and the gearing which joins the two will always work with the same ease, directness, and freedom, and without loss of power from side twists, irregular draft, or variable friction. The engineer K³, standing upon the platform, rotates therewith and always looks ahead through the windows C³ C³ in front of the car, and is in perfect control of his apparatus.

When there is considerable space between the edges of the platform K² and the sides of the car, I usually raise the floor of the car outside the platform to match the same in height, the platform rotating in the floor, like a turn-table, and I sometimes do not carry the floor of the car across the space of the platform, but support the body of the car upon its frame-work alone, having no floor beneath the floor of the platform, but only the heavy cross-timbers of the car-frame.

This construction of the motor-car, with its truck, post, platform, and engine, all attached and operating as one, is not only adapted to electric railways, but to gas, hot-air, or steam engines when so carried and so operating, and I apply it to such purposes, if desired, the only change required being in the motor itself, for which in this application I make no specific claim.

I do not confine myself rigidly to the specific construction shown and described, but modify the same in various ways without departing from the principles of my invention, as herein set forth and claimed.

Having now described my invention, what I claim, and desire to secure by Letters Patent, is—

1. In an electric-motor car, C′, in combination with a front and rear truck and supporting-wheels W² W² W W, one of said trucks adapted to have a motion of partial rotation beneath the body of said car as the same traverses the trackway of an electric railway, a vertical post, C¹, attached to said truck at the center of horizontal rotation thereof and extending upward thereform, and a horizontal platform, K², rigidly attached to the upper part of said vertical post above said truck and within the body of said car, said platform conforming to the independent motions of said truck as said car advances, while the body of said car C′ conforms to the resultant of the motions of both of said trucks, and the motor-dynamo K⁵ K⁷, supportd upon said platform and operating said car, together with current-gathering devices attached to said truck and adapted to be moved thereby in electric contact with the supply-service of an electric railway, substantially as described.

2. The motor-car C′, having a passenger-compartment at one end thereof and an electric-motor compartment at the opposite end thereof, said car C′ supported at its opposite ends upon the pivoted trucks W² W², and moving upon the wheels W W of said trucks, in combination with the independent floor of said motor-compartment attached directly to the truck beneath the same and moving therewith independently of the body of said car, the motor-dynamo K⁵ K⁷, supported upon and attached to said independent floor K² and transmitting the motive power therefrom to the driving-wheels of said truck through a suitable connection, said motor and said truck having a constant relation of direction to each other, together with duplicate pairs of current-gathering devices $c^{10} c^{10}$, electrically connected with said motor-dynamo, one pair attached to the frame of each of said trucks, front and rear, at their centers of horizontal rotation, said current-gathering devices conforming to and directed by the movements of said pivoted trucks, substantially as and for the purposes described.

3. The motor-dynamo K⁵ K⁷ of a motor-car, C′, in combination with a platform for the engineer of said car, and a rotating shaft, all permanently secured to said platform, together with a supporting-axle and its frame-work beneath the body of said car and adapted to conform in direction thereto, and current-gathering devices $c^{10}$, attached to said frame-work at the center thereof and extending downward therefrom, substantially as described.

4. In combination with the truck of an electric-motor car having a pair of driving-wheels and upon the axle of the same a sprocket-wheel or equivalent gear, and a pivoted platform above said truck supported by and moving with the same independently of the motions of the car as a whole, a motor-dynamo built upon said platform and securely attached thereto, said dynamo connected with the electric-supply service of said railway and having a rotating axis parallel with the axle of said car, and a sprocket or equivalent gear upon the said axis, the gear-wheels of said axle and said axis connected by a chain belt or its equivalent, the whole so constructed that the armature of said motor-dynamo by its rotation will rotate said axis, and through said chain belt will cause the axle of said car to rotate and said car to advance, substantially as described.

5. In a motor-car, in combination with supporting truck-wheels W W and truck-frame W², a rigid vertical post, C⁴, attached to the middle of said truck-frame and extended upward into the body of said car, said vertical post surrounded with a flanged expansion or shoulder, c⁴, beneath the top thereof above the frame-work of said truck and adapted to form a support for one end of said car-body, and a horizontal platform rigidly secured to the top of said post C⁴ and within the body C′ of said car, said truck and said platform having their motions common to each other, together with the operating mechanism of said motor-car securely attached to said platform connected with and adapted to operate the driving-wheels thereof, and the car-body C′, supported at one end upon said shoulder c⁴ of said post C⁴ of said truck, and a rear truck to support the rear end of said car-body, substantially as described.

6. In combination with the electric leads A B of an electric railway, the current-gatherers c¹⁰, connections c¹⁵, and motor-dynamo K⁵ of the motor-car C′, the platform K², supporting said dynamo, said platform supported within the body of said car C′ upon post C⁴, said post rigidly secured to the frame-work of truck W², the forward end of said car C′ supported upon a flange of said post C⁴, the whole so constructed that the motions of the platform K² and its supporting-truck shall be alike and independent of the motions of the car-body C′, substantially as and for the purposes described.

7. In a motor-car, the independent floor of the motor attached to its supporting-truck by a rigid vertical post in the center of said truck, in combination with engine K⁵, built upon said platform and connected by suitable gearing with the driving-wheels of said truck, together with the car-body A′, supported at its rear end by a rear truck and loosely pivoted at its forward end to said vertical post upon a flanged shoulder thereof and beneath said platform and adapted to have a limited universal motion thereupon, substantially as described.

ISAAC W. HEYSINGER.

Witnesses:
M. B. FENNINGER,
T. W. RICE.